United States Patent
Bernard

(10) Patent No.: US 9,863,515 B2
(45) Date of Patent: Jan. 9, 2018

(54) SELF-LOCKING NO-BACK ACTUATOR

(71) Applicant: Parker-Hannifin Corporation, Cleveland, OH (US)

(72) Inventor: Guy Bernard, Kirkland (CA)

(73) Assignee: PARKER-HANNIFIN CORPORATION, Cleveland, OH (US)

(*) Notice: Subject to any disclaimer, the term of this patent is extended or adjusted under 35 U.S.C. 154(b) by 383 days.

(21) Appl. No.: 14/661,528

(22) Filed: Mar. 18, 2015

(65) Prior Publication Data

US 2015/0267793 A1 Sep. 24, 2015

Related U.S. Application Data

(60) Provisional application No. 61/954,656, filed on Mar. 18, 2014.

(51) Int. Cl.
*F16H 25/00* (2006.01)
*F16H 25/24* (2006.01)
*B64C 13/34* (2006.01)

(52) U.S. Cl.
CPC ......... *F16H 25/2454* (2013.01); *B64C 13/34* (2013.01); *Y10T 74/19637* (2015.01)

(58) Field of Classification Search
CPC ............................ F16H 25/2454; B64C 13/34
See application file for complete search history.

(56) References Cited

U.S. PATENT DOCUMENTS

| | | | | |
|---|---|---|---|---|
| 2,240,043 A * | 4/1941 | Kinser | ................... | F16D 59/00 188/134 |
| 4,480,733 A | 11/1984 | Grimm et al. | | |
| 4,842,109 A * | 6/1989 | Avny | ....................... | B66D 1/14 188/82.77 |
| D528,882 S * | 9/2006 | Dobras | ............... | F16H 25/2454 D8/25 |
| 8,511,441 B2 * | 8/2013 | Lang | ...................... | B64C 13/28 188/134 |
| 8,646,726 B2 * | 2/2014 | Manzanares | ............ | B64C 13/28 192/223.1 |
| 9,394,980 B2 * | 7/2016 | Jones | .................. | F16H 25/2454 |
| 9,470,272 B2 * | 10/2016 | Gitnes | ....................... | F16D 7/00 |
| 9,527,580 B2 * | 12/2016 | Lang | ...................... | B64C 13/28 |
| 2003/0084736 A1 | 5/2003 | Darby | | |
| 2004/0040813 A1 | 3/2004 | Darby et al. | | |
| 2011/0006154 A1 | 1/2011 | Maresko et al. | | |
| 2013/0152717 A1 | 6/2013 | Kopecek | | |

* cited by examiner

*Primary Examiner* — David M Fenstermacher
(74) *Attorney, Agent, or Firm* — Renner, Otto, Boisselle & Sklar, LLP.

(57) ABSTRACT

A self-locking actuator for moving a flight control surface of an aircraft and for self-locking in response to an external load applied to the actuator. The actuator includes a motor, a screw, and a drive gear that is rotatably driven by the motor to rotationally couple with the screw. A pawl support is coupled to and rotatable with the screw, and a swivel assembly is coupled to the pawl support for rotational movement with the screw and pivoting movement relative to the screw. The swivel assembly engages a cage that is fixed relative to the rotating screw, drive gear, and swivel assembly. Pivoting of the swivel assembly about a pivot axis engages the swivel assembly with the cage to positively lock with the cage and to prevent rotation of the screw in each of first and second opposite rotational directions of the screw about a rotational axis of the screw.

20 Claims, 10 Drawing Sheets

SELF-LOCKING NO-BACK ACTUATOR

RELATED APPLICATIONS

This application claims the benefit of U.S. Provisional Application No. 61/954,656 filed Mar. 18, 2014, which is hereby incorporated herein by reference in its entirety.

FIELD OF INVENTION

The present invention relates generally to self-locking actuators, and more particularly to self-locking aircraft flight control actuators for moving aircraft flight control surfaces.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw and roll axes, and the secondary flight control surfaces are those that are used to influence the lift or drag (or both) of the aircraft. Although some aircraft may include additional control surfaces, the primary flight control surfaces typically include a pair of elevators, a pair of ailerons and a rudder, and the secondary flight control surfaces typically include a horizontal stabilizer, a plurality of flaps, slats and spoilers.

Modern aircraft have one or more flight control actuators located at each flight control surface for controlling precise positioning of the surface. Slight adjustment, even by a few degrees, can have a large effect on aircraft movement about one or more of the pitch, yaw and roll axes. Flight control surfaces are also acted upon by turbulence and other movement of air surrounding the respective aircraft. The actuators must be capable of substantially resisting such forces and vibration levels to maintain positioning of the flight control surfaces and control of a current trajectory of the aircraft along an associated flight path. Therefore, such actuators often include a component referred to as a "no-back" to prevent position changes under external conditions when the actuator drivetrain is disengaged. A typical no-back uses friction to provide irreversibility, though this type of no-back is often susceptible to substantial creep when exposed to certain combinations of vibration and load.

SUMMARY OF INVENTION

The present invention provides a self-locking actuator for moving a flight control surface of an aircraft and for self-locking in response to an external load applied to the actuator. The actuator includes a motor, a screw, and a drive gear that is rotatably driven by the motor to rotationally couple with the screw. A pawl support is coupled to and rotatable with the screw, and a swivel assembly is coupled to the pawl support for rotational movement with the screw and pivoting movement relative to the screw. The swivel assembly engages a cage that is fixed relative to the rotating screw, drive gear, and swivel assembly. Pivoting of the swivel assembly about a pivot axis engages the swivel assembly with the cage to positively lock with the cage and to prevent rotation of the screw in each of first and second opposite rotational directions of the screw about a rotational axis of the screw.

According to one aspect of the invention, a self-locking actuator includes an actuator housing, a motor, a screw supported in the housing for rotational movement, a drive gear rotatably driven by the motor to rotationally couple the drive gear with the screw, a cage fixed relative to the housing and having a plurality of circumferentially spaced apart cage slots, and a pawl support rotatable with the screw. A swivel assembly is coupled to the pawl support for pivoting movement about a pivot axis parallel to a rotational axis of the drive gear, and has an arcuate arrangement of teeth in meshed engagement with the drive gear, wherein the drive gear is disposed in a lost motion configuration with the screw such that the drive gear is driven to pivot the swivel assembly between engagement and disengagement with one of the plurality of cage slots prior to the drive gear being driven to engage the screw for rotational movement of the screw with the drive gear.

The swivel assembly may pivot about the pivot axis to engage the swivel assembly with the cage to positively lock with the cage and to prevent rotation of the screw in each of first and second opposite rotational directions of the screw about the rotational axis.

The swivel assembly may include a pawl that is moved into and out of engagement with the one of the plurality of cage slots via pivoting of the swivel assembly.

The pawl may be farther radially outwardly disposed than the arcuate arrangement of teeth relative to the rotational axis.

Relative to a stationary drive gear, rotation of the screw in each of a clockwise and counterclockwise direction about the rotational axis may drive the swivel assembly to pivot about the pivot axis to positively lock with the cage to prevent the rotation of the screw in its respective rotational direction.

The pivot axis may be fixed relative to and rotate with the screw about the rotational axis such that the swivel assembly rotates with the screw.

The cage may be translationally fixed relative to the screw.

The cage may be circumferentially disposed about the screw, wherein the cage slots open radially inwardly towards the rotational axis.

The drive gear may be disposed about the screw.

According to another aspect of the invention, a self-locking actuator includes an actuator housing, a screw supported in the housing for rotational movement, a cage fixed relative to the housing, and a swivel plate for pivoting movement about a plate pivot axis parallel to a rotational axis of the screw, wherein the plate pivot axis is fixed relative to the screw and rotates with the screw about the rotational axis. A pawl is coupled to the swivel plate for engagement with the cage, wherein the pawl is pivotally coupled to the swivel plate for pivoting movement about a pawl pivot axis parallel to the plate pivot axis, wherein pivoting movement of the swivel plate moves the pawl between a first position engaged with the cage and a second position disengaged from the cage.

The self-locking actuator may further include a pair of pawls coupled to the swivel plate for engagement with the cage, each pawl being coupled for pivoting movement about a respective pawl pivot axis parallel to the plate pivot axis.

The cage may have a plurality of circumferentially spaced apart cage slots, wherein the pawl pivots about the pawl pivot axis to engage and disengage the plurality of cage slots when the screw rotates in a first rotational direction about the rotational axis and the pawl positively locks with one of the plurality of cage slots when the screw rotates in a second rotational direction opposite the first rotational direction.

The pawl may be biased towards the cage by a biasing element.

The pawl may include a ramp surface that cams outwardly and a catch surface that positively locks with the cage.

The cage may have a plurality of circumferentially spaced apart cage slots, wherein engagement of the ramp surface with a cage slot of the cage pivots the pawl about the pawl pivot axis while engagement of the catch surface with the cage slot or another cage slot of the cage positively locks the pawl with to the respective cage slot.

According to yet another aspect of the invention, a self-locking actuator includes an actuator housing, a motor, a screw supported in the housing and rotatable relative to the housing, the screw drivable by the motor, a cage fixed relative to the housing, and a swivel assembly coupled to the screw for rotation with the screw and pivotable about a pivot axis parallel to a rotational axis of the screw. The swivel assembly is pivotable about the pivot axis to prevent rotation of the screw in each of opposing first and second rotational directions of the screw about a rotational axis via engagement of the swivel assembly with the cage.

The motor may be coupleable with swivel assembly to drive the swivel assembly, wherein the swivel assembly is pivotable about the pivot axis in each of a first pivot direction or a second pivot direction opposite the first pivot direction via each of the motor or an external load external to the self-locking actuator rotating the screw.

The motor may be coupleable with the screw to drive the screw, wherein the swivel assembly is pivotable about the pivot axis to engage the cage prior to the motor coupling with the screw to drive rotation of the screw.

The swivel assembly and the cage may be configured to positively lock with one another in response to a load external to the self-locking actuator urging the screw in either of the first or second rotational directions.

The swivel assembly may be configured to pivot about the pivot axis to engage the cage while the screw is and is not rotating via the motor.

The foregoing and other features of the invention are hereinafter described in greater detail with reference to the accompanying drawings.

DETAILED DESCRIPTION

The principles of the present disclosure have particular application to flight control actuators for controlling a flight control surface of a vehicle, such as an aircraft. It will be appreciated, however, that the principles are applicable to other actuators including linear and rotary actuators where there is a need to resist forces and vibration moving the actuator both in forward and reverse directions. The forward and reverse directions may be linear directions in the case of a linear actuator or rotational directions in the case of a rotary actuator.

Figure 1:
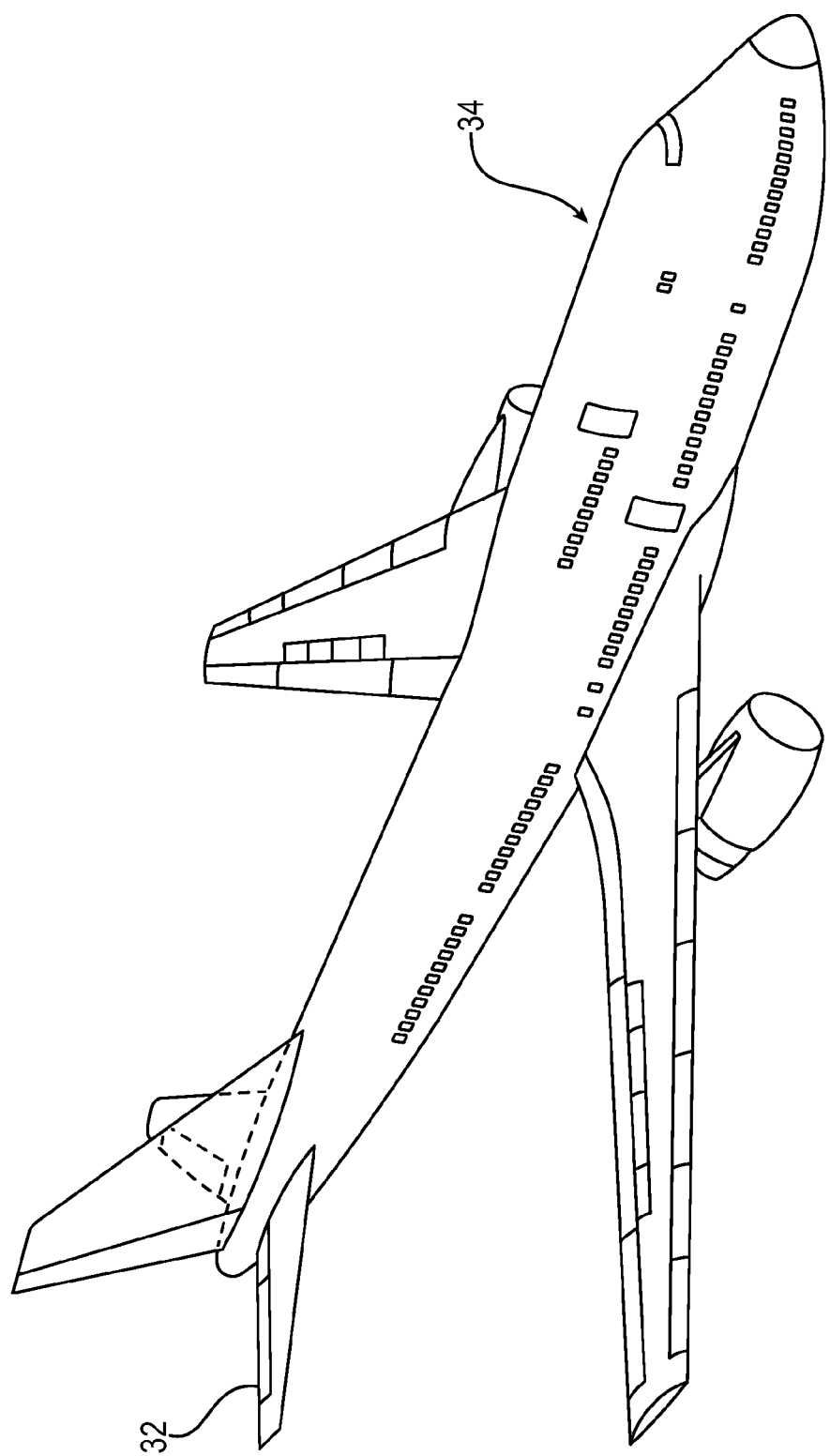
FIG. 1 is an orthogonal view of an aircraft including an exemplary actuator according to the present invention.
Figure 2:
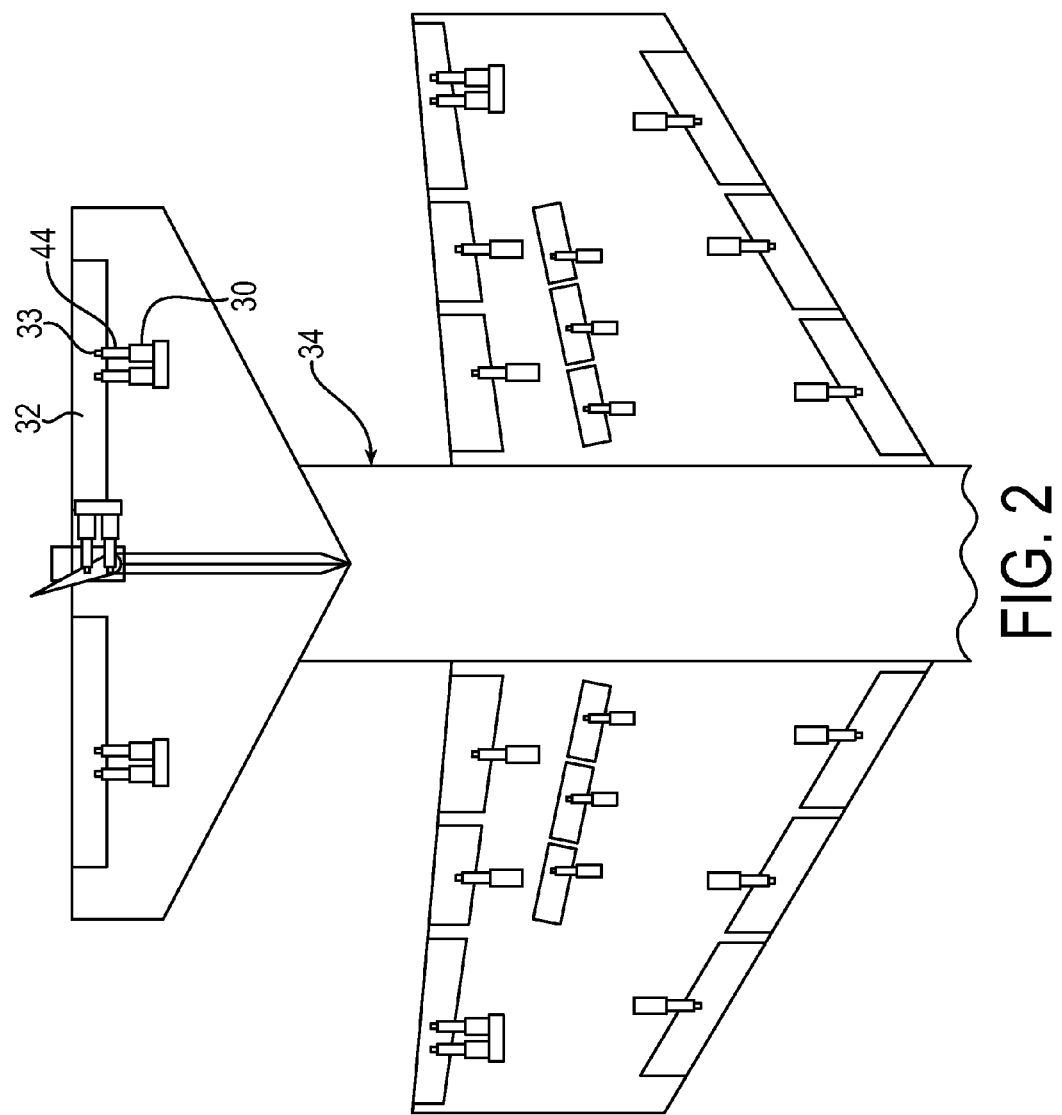
FIG. 2 is a partial elevated cross section top view of the aircraft of FIG. 1.

Turning to FIGS. 1 and 2, the self-locking actuator 30, also herein referred to as the actuator 30, of the present invention is provided to control a flight control surface 32 of a vehicle, such as the aircraft 34. The actuator 30 is configured to actuate in response to a controller (not shown) to move the flight control surface 32 in first and second opposite directions. For example, the depicted actuator 30 may be a ball screw linear actuator. Though in other applications, the actuator may be a rotary actuator or any other suitable type of linear actuator.

The self-locking actuator 30 is configured to extend and retract thereby moving a force transfer member 33, such as a gimbal, in response to a signal from the controller (not shown). The force transfer member couples the actuator 30 to the respective flight control surface 32. The self-locking actuator 30 is further configured to resist both aiding and opposing external loads acting on the flight control surface 32, and thus on the actuator 30. As used herein, coupling may include direct or indirect coupling.

Limited to no movement of the flight control surface 32 is allowed due to the actuator 30 being a no-back type actuator, allowing the actuator 30 to comply with relevant vehicle requirements. Accordingly, the self-locking actuator 30 is a no-back type constructed such that it will have limited slip in response to external load and will positively lock while the actuator 30 is both actuating and stationary or not actuating. For example, while the actuator 30 is actuating, it temporarily positively locks to prevent over-movement of the actuator 30 in the actuating direction.

Figure 3:
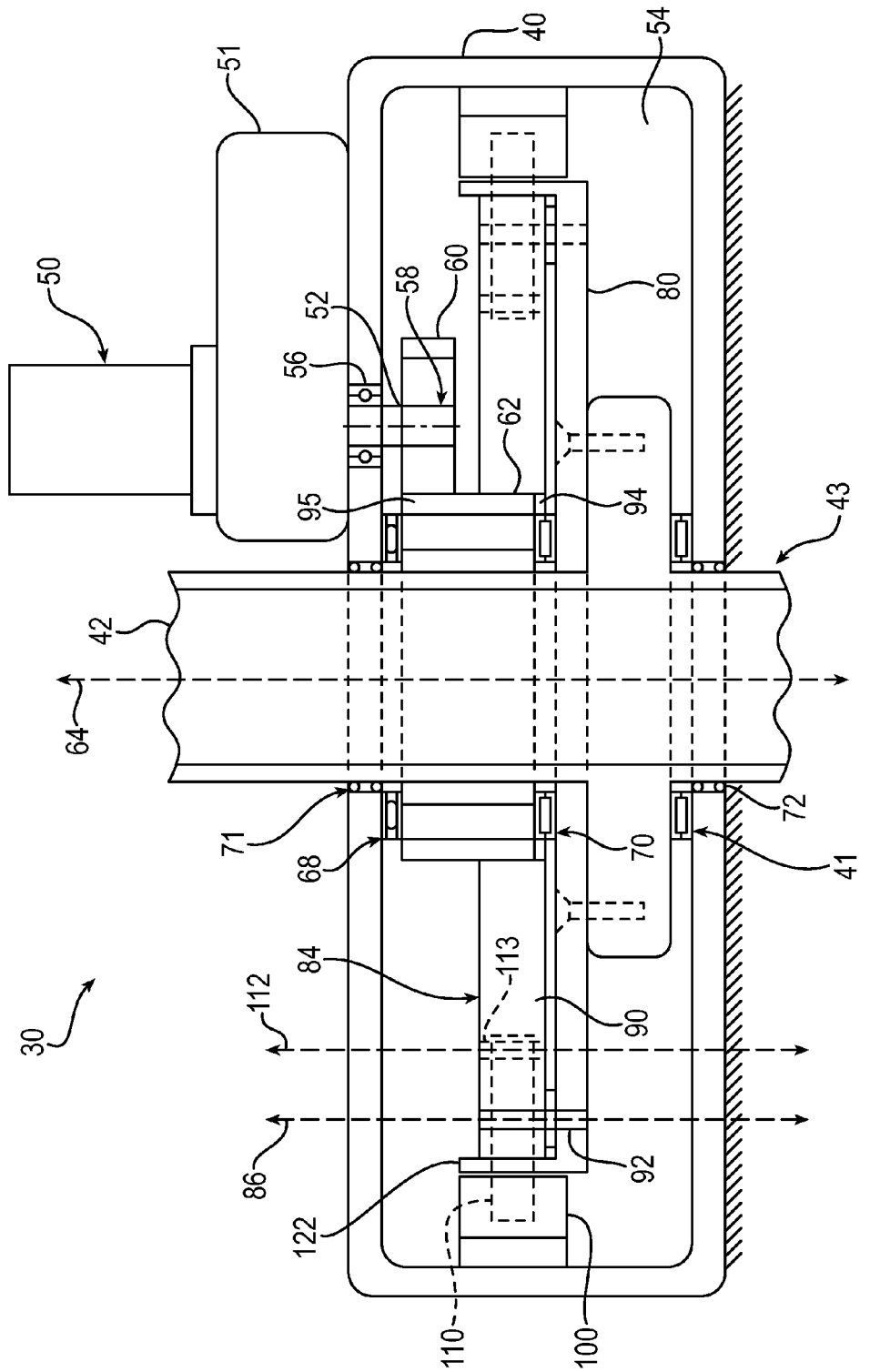
FIG. 3 is a partial cross section side view of an exemplary actuator according to the present invention.
Figure 4:
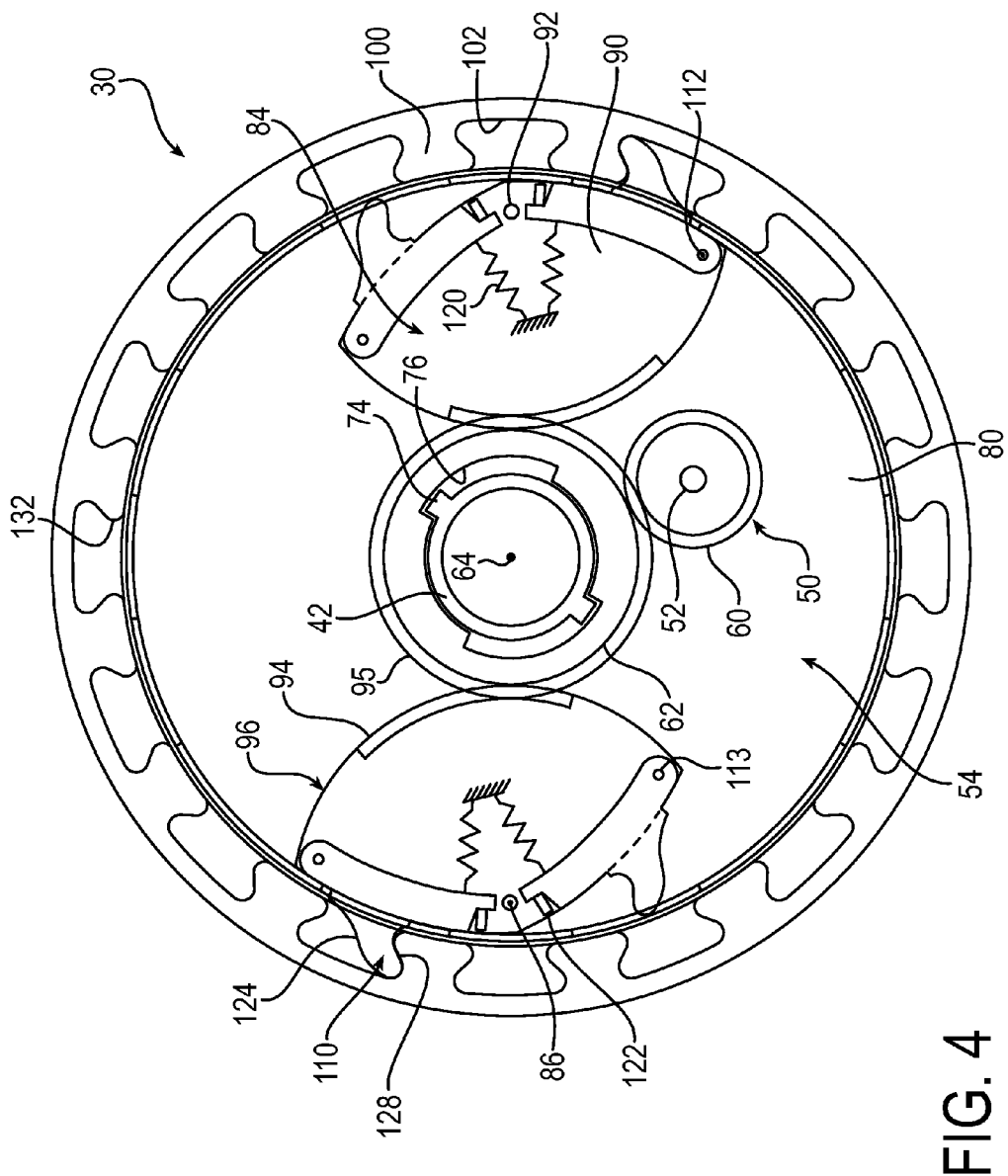
FIG. 4 is a partial elevated cross-section top view of the exemplary actuator of FIG. 3.

Referring now to FIGS. 3 and 4, the depicted self-locking actuator 30 includes a housing 40 that is configured for mounting to any suitable portion of the vehicle. For example the housing 40 may be welded to the vehicle or fixedly attached via suitable fasteners. In other embodiments, any other suitable portion of the actuator 30 may be mounted to the vehicle.

The actuator 30 includes a screw 42 for rotating to move the flight control surface. The screw 42 is supported in the housing 40 for rotational movement, such as relative to the housing 40. The screw 42 may be supported at minimum via the housing 40 itself, and more preferably via rotary bearings 41, such as bushings, radial bearings, thrust bearings, etc. Alternatively, the screw 42 may be supported externally to the housing 40, such as via external rotary bearings.

As will further be appreciated, the screw 42 and housing 40 are generally translationally fixed relative to one another, absent typical movement caused by vibration, changes in pressure, changes in temperature, etc. For example, the screw 42 may be coupled to the vehicle for translationally fixing the screw 42 at a proximal end 43 of the screw 42 disposed adjacent the housing 40.

The screw 42 may be any suitable type of screw, such as a ball screw. Where the screw 42 is a ball screw, it may be suitably attached to a translating member 44 (FIG. 2), such as a nut, rotatably supported relative to the screw 42 and configured for linear translation along the screw 42. In such case, the nut will be prevented from rotating relative to the screw via a suitable anti-rotation device fixed relative to the screw 42, and the nut will be attached to the flight control surface, such as via coupling to a suitable force transfer member.

Turning again to the depicted actuator 30, a motor 50 is provided for driving rotation of the screw 42, and preferably for driving indirect rotation of the screw 42. The motor 50 is shown supported at least partially in the housing 40. A motor housing 51 may be coupled to the housing 40 by any suitable method, such as by fasteners, or alternatively the housing 40 may be coupled to the vehicle. The motor housing 51 may contain suitable reduction gears. A motor shaft 52 extends from the motor housing 51 and into an inner chamber 54 of the housing 42. The motor shaft 52 is supported by rotary bearings 56, such as bushings, radial bearings, roller bearings, etc. A motor drive gear 60 is fixedly attached to the distal end 58 of the motor shaft 52 for rotary coupling with a drive gear 62. Though in other embodiments, the motor shaft 52 or any other suitable motor component may be coupled to the drive gear 62.

The motor 50 may be reversibly activated to drive the drive gear 62 in opposite rotational directions. Thus a power source (not shown) is coupled to the motor 50. And the controller (not shown) may be communicatively coupled, such as by wires or wirelessly, to the motor 50 for controlling the speed and rotational direction of the motor output, such as of the motor shaft 52.

The drive gear 62 is rotationally coupled between the screw 42 and the motor 50. The drive gear 62 is rotatably driven by the motor 50 to rotationally couple the drive gear 62 with the screw 42. The screw 42 may be rotationally coupled and decoupled to the motor 50 via the drive gear 62 for rotating the screw 42 about a rotational axis 64 of the screw 42. As shown, the drive gear 62 is disposed about the screw 42 and has a drive gear rotational axis that is colinear with the rotational axis 64. In other embodiments the drive gear 62 may be disposed otherwise adjacent the screw 42 and the rotational axes of the screw 42 and drive gear 62 may not be colinear.

The drive gear 62 is supported in the housing 40 via rotary bearings 68 and 70, such as bushings, roller bearings, radial bearings, etc. For example, the upper bearings 68 are disposed between the housing 40 and the drive gear 62, while the lower bearings 70 are also disposed between the drive gear 62 and the housing 40. The bearings 68 or 70, or any of the bearings 41 or 56, may include any suitable number of individual bearing portions, such as supported in a bearing cage.

Within the housing 40, each of the motor 50 and drive gear 62 may have any suitable number of corresponding teeth for meshed engagement with one another. Further, the meshing teeth of the motor 50 and drive gear 62 may be of any shape suitable for meshing with one another.

Within the inner chamber 54 of the housing 40, the meshable teeth may be in contact with, such as being submerged in, a suitable lubricant or grease to increase functional efficiency of the actuator 30. Thus, the drive gear 62 is preferably fully submerged in lubricant in the inner chamber 54. The depicted housing 40 is sealed about the depicted screw 42 and the depicted motor 50, which extend through the housing 40. For example, seals 71 and 72, such as o-rings, are disposed about the screw 42 between the screw 42 and the housing 40, and may be retained in a suitable groove in either of the screw 42 or housing 40. Additional seals may be disposed about the motor shaft 52 or between the motor housing 51 and the housing 40.

As shown best in FIG. 4, the drive gear 62 and the screw 42 may rotationally couple to one another for rotating with one another, such as about the rotational axis 64 via a key and groove mechanism. The depicted screw 42 has the key 74 at a radially outward surface, while the depicted drive gear 62 has the groove 76 at a radially inward surface, though in other embodiments the screw 42 may instead have a groove and the drive gear 62 may have a respective key. The depicted groove 76 has a circumferential extent about the rotational axis 64 that is greater than a width or circumferential extent of the key 74. This construction enables the key 74 or the groove 76 to be rotated about the rotational axis 64 a certain circumferential distance prior to engaging the other of the key 74 or the groove 76. Further, two sets of keys 74 and grooves 76 are shown, while any suitable number of keys and grooves may be used in other embodiments.

Through engagement of the keys 74 and grooves 76, the screw 42 may be driven via the motor 50, i.e., via engagement of each of the screw 42 and motor 50 with the drive gear 62. For example, the groove 76 and respective key 74 are configured in a lost motion configuration such that where the key 74 and the groove 76 are circumferentially spaced from one another and are not yet in contact, the key 74 or the groove 76 may be rotated without being caused to engage the other of the key 74 or the groove 76. After being rotated a prescribed circumferential distance, the key 74 or the groove 76 then engages the other of the key 74 or the groove 76, causing the key 74 and the groove 76 to move together. This lost motion configuration allows for the self-locking actuator 30 to positively lock in either of opposite output directions to prevent unwanted movement of the respective flight control surface, to be further explained.

Referring again to both FIGS. 3 and 4, a pawl support 80 is fixedly coupled to the screw 42 for rotation with the screw 42. The pawl support 80, and thus the screw 42, is supported in the housing 40 for rotational movement via the bearings 41 disposed between the pawl support 80 and the housing 40. The pawl support 80 is shown shaped as a flange integral with the screw 42 at a location within the housing 40. As shown, the pawl support 80 extends radially outwardly from the screw 42 and extends fully circumferentially about the screw 42, though the pawl support 80 may be non-circumferentially continuous in other embodiments. In other embodiments, the pawl support 80 and screw 42 may be separate components and/or the pawl support 80 may have any suitable shape.

A swivel assembly 84 is coupled to the pawl support 80 for pivoting movement about a plate pivot axis 86. The pivot axis 86 is preferably parallel to the rotational axis 64, and more preferably to the rotational axis of the drive gear 62. The swivel assembly 84 is coupled to the screw 42 via the pawl support 80 for rotation with the screw 42 about the rotational axis 64. The depicted pivot axis 86 is disposed adjacent a radially outward edge of the pawl support 80 and is fixed relative to the screw 42. The pivot axis 86 rotates with the swivel assembly 84 about the rotational axis 64 with the screw 42.

Via engagement with the drive gear 62, the swivel assembly 84 is caused to pivot about the pivot axis 86 to positively lock relative to the housing 40 to prevent the screw 42 from being turned in either of first and second opposite rotational directions about the rotational axis 64 in response to external loads acting on the screw 42. In the case of an aircraft, the external load is typically caused by turbulence acting on the flight control surface and directed into the actuator 30 through the screw 42.

To engage the drive gear 62, the swivel assembly 84 includes a swivel plate 90 that is engaged with the drive gear 62. The swivel plate 90 is pivotably attached to the pawl support 80, such as via a pin member 92 or via any other suitable method. The swivel plate 90, and thus the swivel assembly 84, has an arcuate arrangement of teeth 94 in meshed engagement with corresponding teeth 95 of the drive gear 62. The arcuate arrangement of teeth 94 is disposed at an arcuate edge 96 of the swivel plate 90 and is located radially inward of the pivot axis 86. Any suitable number of teeth may be included in the swivel plate 90 over any suitable arcuate length of the swivel plate 90.

Via the meshed engagement, the swivel plate 90 may be driven to pivot (also herein referred to as swiveling) about the plate swivel axis 86 via rotation of the drive gear 62, which is in turn driven by the motor 50. Accordingly, rotation of the drive gear 62 causes pivoting of the swivel plate 90 about the pivot axis 86 relative to each of the screw 42 and the pawl support 80.

The swivel plate 90 is pivoted to engage with a cage 100 that is fixed to the housing 40. The cage 100 is translationally fixed relative to the screw 42 along with the housing 40. The cage 100 is preferably disposed about the screw 42 and the swivel assembly 84. While the cage 100 is shown as extending fully circumferentially about the screw 42 and the rotational axis 64, in other embodiments, the cage 100 may not be circumferentially continuous.

The cage 100 has a plurality of preferably circumferentially spaced apart cage slots 102. The depicted cage slots 102 are equally spaced about the cage 100. The cage slots 102 open radially inwardly towards the rotational axis 64 for engagement with the swivel assembly 84.

The swivel assembly 84 is configured to positively lock with the cage slots 102 of the cage 100 to prevent the rotation of the screw 42 in each of the opposing first and second rotational directions of the screw 42 about the rotational axis 64. The swivel assembly 84 is pivoted in a first pivot direction to prevent the screw 42 from rotating in the first rotational direction and is likewise pivoted in a second pivot direction to prevent the screw 42 from rotating in the second rotational direction.

More particularly, due to the drive gear 62 being disposed in a lost motion configuration with the screw 42, the drive gear 62 may be driven by the motor 50 to pivot the swivel assembly 84 between engagement and disengagement with one of the plurality of cage slots 102 prior to the drive gear 62 being driven to engage the screw 42 for rotational movement of the screw 42 with the drive gear 62. Accordingly, the motor 50 is coupleable with the swivel assembly 84 to drive the swivel assembly 84.

Additionally, via engagement of the swivel plate 90 with the cage slots 102, the swivel assembly 42 is driven to pivot in a respective pivot direction in response to rotation of the screw 42 separate from activation of the motor 50, such as when the motor is not activated and becomes stationary due to an external brake or to its own internal cogging torque. Such rotation of the screw 42 may be caused by an external load acting on the actuator 30 to turn the screw 42 in either of the first or second (i.e., clockwise and counterclockwise) rotational directions, thus causing rotation of the swivel assembly 84 with the screw 42 relative to the cage 100. However, the screw 42 is prevented from further rotating in either of the first and second rotational directions via respective pivoting of the swivel assembly 84 to engage the cage 100, again caused by positive locking of the swivel plate 90 with the cage slots 102.

Accordingly, in response to an opposing or aiding external load acting on the screw 42, the swivel assembly 84 is caused to pivot and engage the cage slots 102 both while the screw 42 is not being driven by the motor 50. And in response to an aiding load, the swivel assembly 84 may also caused to temporarily engage the cage 100 while the screw 42 is being driven by the motor 50. Thus, depending on the type of external load relative to the actuator, rotation of the screw 42 caused by an external load may be prevented via pivoting of the swivel plate 90 of the swivel assembly 84 to engage the cage slots 102.

For example, in response to an aiding external load provided in the actuating direction of the presently rotating screw 42, the swivel assembly 84 may be caused to pivot to temporarily positively lock with the cage 100 to prevent rotation of the screw 42 in the actuated direction. On the other hand, in response to an opposing external load provided in a direction opposite the actuating direction of the presently rotating screw 42, it will be appreciated that the motor 50 will be configured, such as sized, to overcome such load.

Further, where the self-locking actuator 30 is used in an alternative application, it may be the case that the motor 50 may not be sized to overcome an opposing load. In such case the swivel assembly 84 positively locks with the cage 100 to prevent the opposing external load from damaging the respective motor 50.

To engage the cage slots 102 of the cage 100, the swivel assembly 84 includes pawls 110 that are configured, such as being shaped, to engage and positively lock with the cage slots 102. Likewise, the pawls 110 are also configured, such as being shaped, to engage and disengage the cage slots 102, such as via sliding, to enable the screw 42 (coupled to the swivel assembly 84) to be turned by the motor 50, such as to advance or retract the nut of the actuator 30. It is noted that in the situation where the actuator 30 is a rotary actuator and not a linear actuator, the actuator 30 may not advance and retract at its output but may instead rotate in opposing directions at its output.

The depicted (FIGS. 3 and 4) swivel assembly 84 includes opposed swivel plates 90 each having a pair of pawls 110. In the case of failure of one of the pawls 110 of a pair of pawls 110, or in the cause of failure of one of the swivel plates 90, the self-locking actuator 30 may still function to prevent unwanted movement of a flight control surface in accordance with respective requirements. In other embodiments, any suitable number of swivel plates 90 or pawls 110 may be used, such as four swivel assemblies 84 as shown in FIGS. 5-10.

Each pawl 110 is coupled to the respective swivel plate 90 for engagement with the cage slots 102 of the cage 100 via pivoting movement about a respective pawl pivot axis 112. The pawls 110 are coupled to the swivel plates 90 such as via pins 113 engaged between each pawl 110 and respective swivel plate 90. Each pawl pivot axis 112 is disposed parallel to the plate pivot axis 86 and to the rotational axis 64. The pawls 110 are disposed at a radially outward portion of each swivel assembly 84 and thus are disposed farther radially outwardly than the respective arcuate arrangement of teeth 94 relative to the rotational axis 64.

Pivoting movement of the swivel plate 84 relative to the cage 100 moves each pawl 110 of the respective pair of pawls 110 between a first position engaged with the cage 100 and a second position disengaged from the cage 100. For example, when the swivel plate 90 pivots about the plate pivot axis 86 in a first pivot direction, one of the respective pawls 110 moves toward and is caused to engage a respective cage slot 102, while the other of the respective pawls 110 moves away from and is caused to disengage from another respective cage slot 102. Accordingly, the cage slots 102 are disposed about the rotational axis 64 and are spaced and dimensioned such that a cage slot 102 will be generally adjacent each pawl 110 regardless of the circumferential positioning of the respective pawl 110 about the rotational axis 64.

Each pawl 110 is biased towards the cage 100 via a biasing element 120, such as a spring coupled between the respective pawl 110 and swivel plate 90. The biasing elements 120 are provided to enable the pawls 110 to slide into and out of the cage slots 102 when engaged with the cage slots 102, to enable rotation of the screw 42 in a rotational direction. The biasing elements 120 are attached to the swivel plates 90 via any suitable method, such as via crimping, fasteners, etc. A pawl stop 122 is radially outwardly disposed relative to the rotational axis 64 for limiting outward positioning of each pawl 110 towards the cage 110. As shown, the pawl stops 122 are integral with the swivel plate 90 though may be separate components in other embodiments.

Each pawl 110 includes a ramp surface 124 that cams outwardly and a catch surface 128 that positively locks with a cage slot 102 of the cage 100. Referring to a single pair of pawls 110, the two pawls 110 are aligned to pivot outwardly in opposite directions away from each other. The ramp surfaces 124 face away from each other while the catch surfaces 128 face inwardly towards one another and towards the plate pivot axis 86.

The ramp surfaces 124 and catch surfaces 128 cooperate with the cage slots 102 to enable rotation of the screw 42 when rotated via activation of the motor 50 and to prevent rotation of the screw 42 when acted upon via an external load. During usage of the actuator 30, each pawl 110 of a pair of pawls 110 may be partially engaged with the cage 100 while the swivel assembly 84 is pivoting between maximum opposite first and second pivot positions. However, only one pawl 110 of each pair of pawls 110 is fully engaged with the cage 100 at a time.

For example, referring now to one engaged pawl 110 but equally applicable to the other pawls 110, rotation of the screw 42 in a first rotational direction via the motor 50 causes the ramp surface 124 of the engaged pawl 110 to cam or slide against the cage 100. The pawl 110 is caused to pivot out of one cage slot 102 via cam action of the ramp surface 124 against the cage 100, and is caused to pivot into the adjacent cage slot 102 via the biasing force of the respective biasing element 120 as the screw 42 continues to rotate in the first rotation direction. On the other hand, rotation of the swivel assembly 84 in the opposite direction about the rotational axis 64 causes the catch surface 128 to positively lock with the respective cage slot 102 preventing further rotation of the screw 42 in the opposite direction.

The cage slots 102 are accordingly shaped to catch and positively lock with oppositely facing catch surfaces 128 and to slide against oppositely facing ramp surfaces 124 without catching against the ramp surfaces 124. For example, the depicted catch surfaces 128 have a concave shape while the depicted ramp surfaces 124 have a convex shape. An opening 130 of each cage slot 102 includes opposing rounded portions 132. The rounded portions 132 are each shaped to positively lock with the convex shape of a catch surface 128 and to allowing sliding or cam-ing of a ramp surface 124 against the rounded portions 132.

Figure 7:
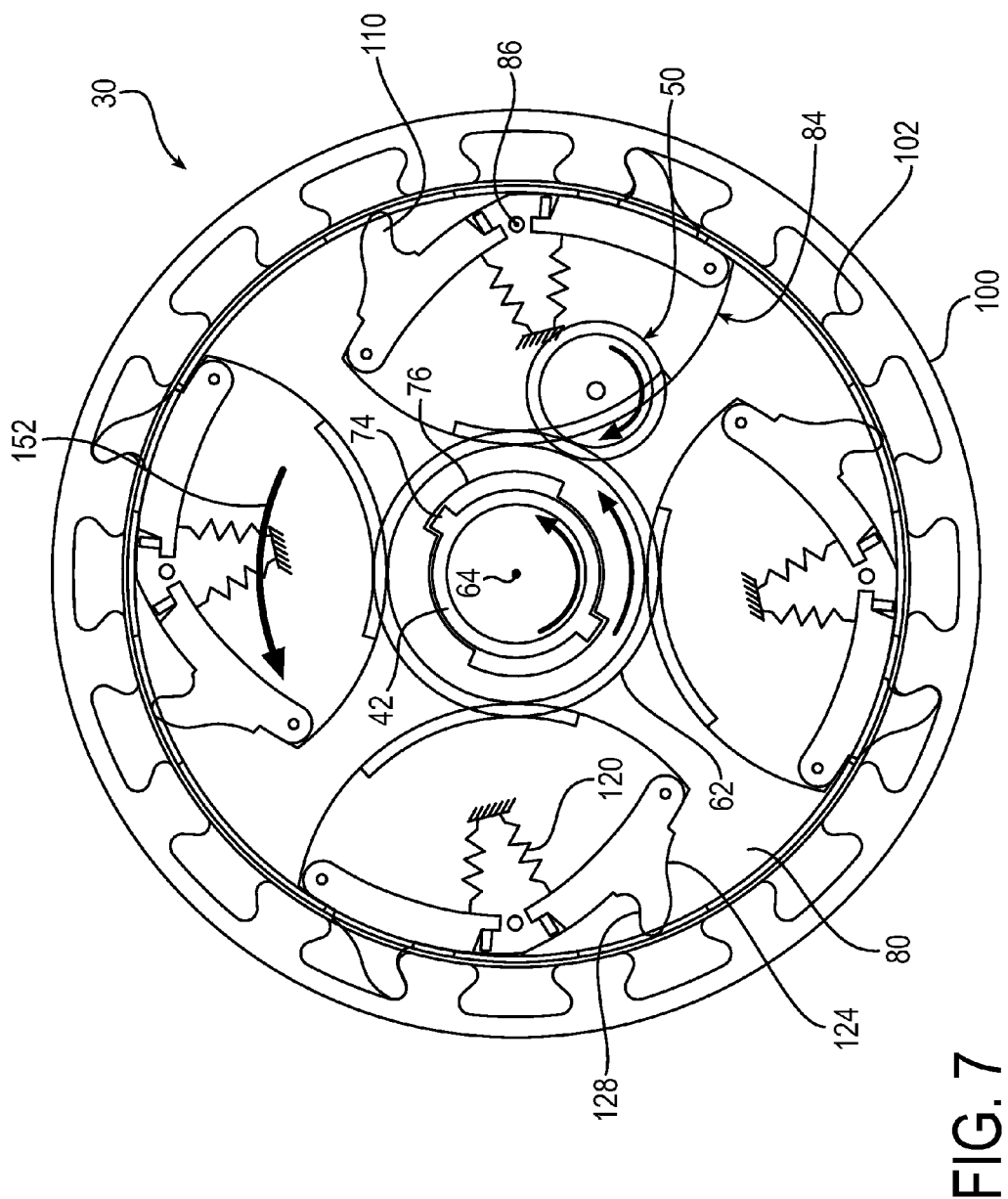
FIG. 7 is still another partial elevated cross-section top view of the exemplary actuator of FIG. 3.
Figure 8:
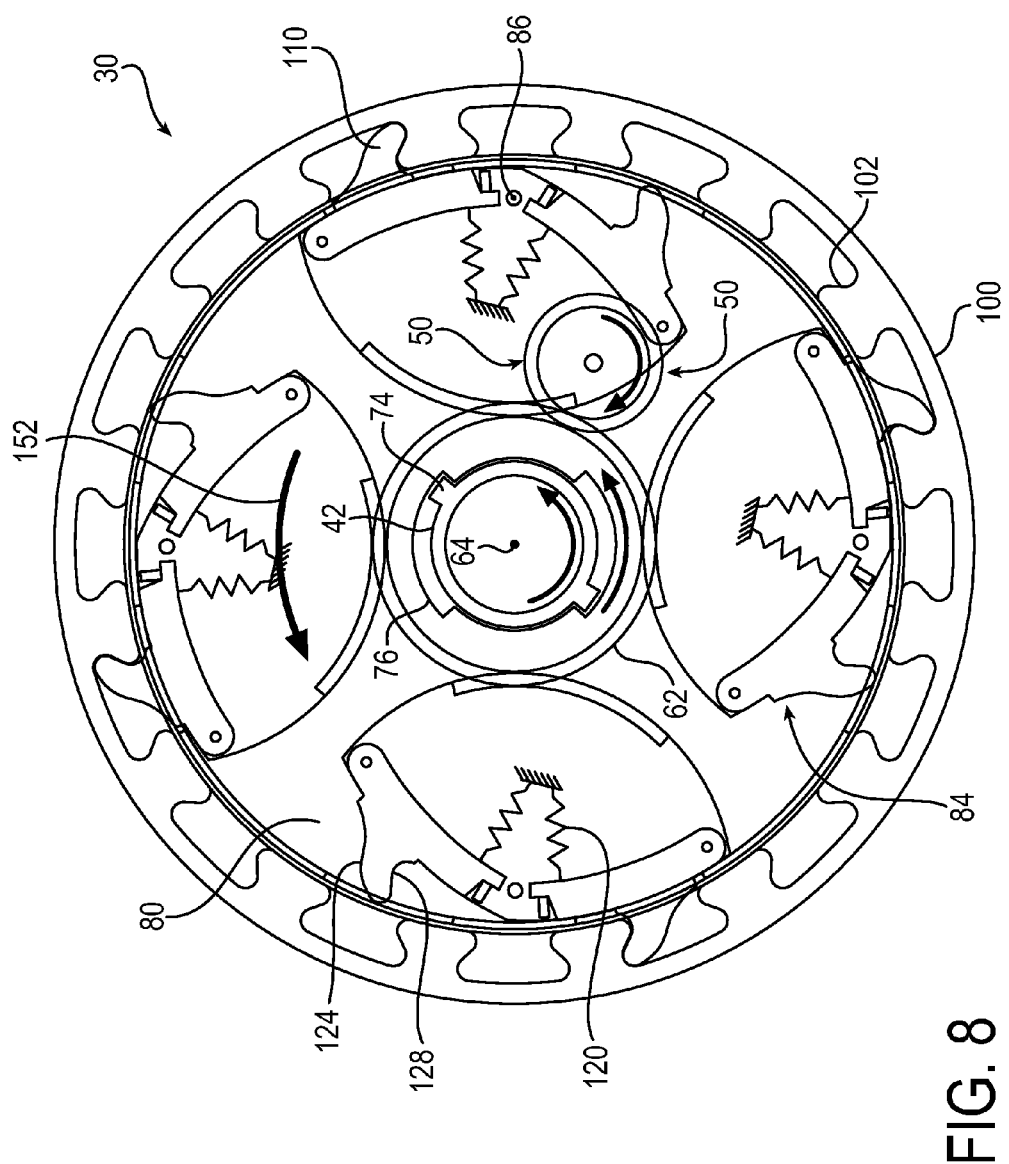
FIG. 8 is a further partial elevated cross-section top view of the exemplary actuator of FIG. 3.
Figure 9:
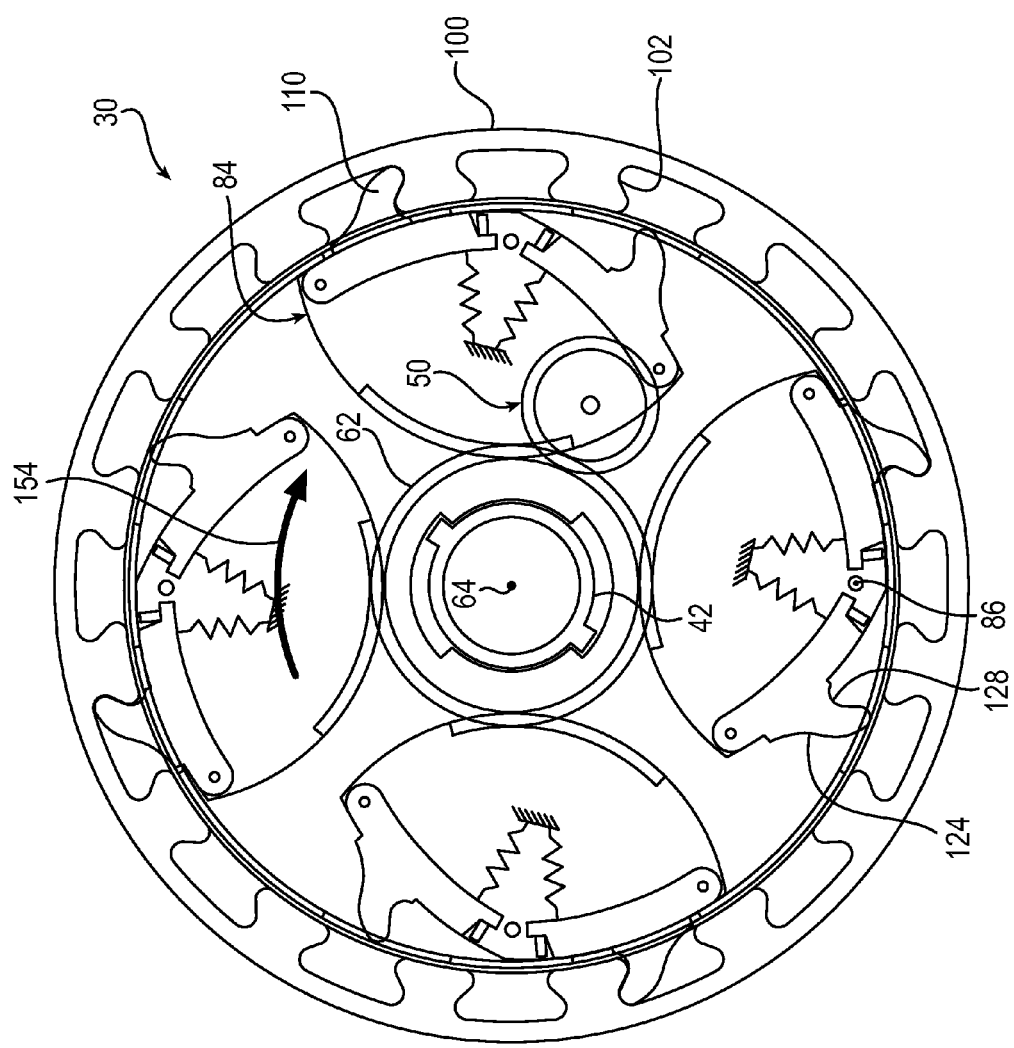
FIG. 9 is another partial elevated cross-section top view of the exemplary actuator of FIG. 3.
Figure 10:
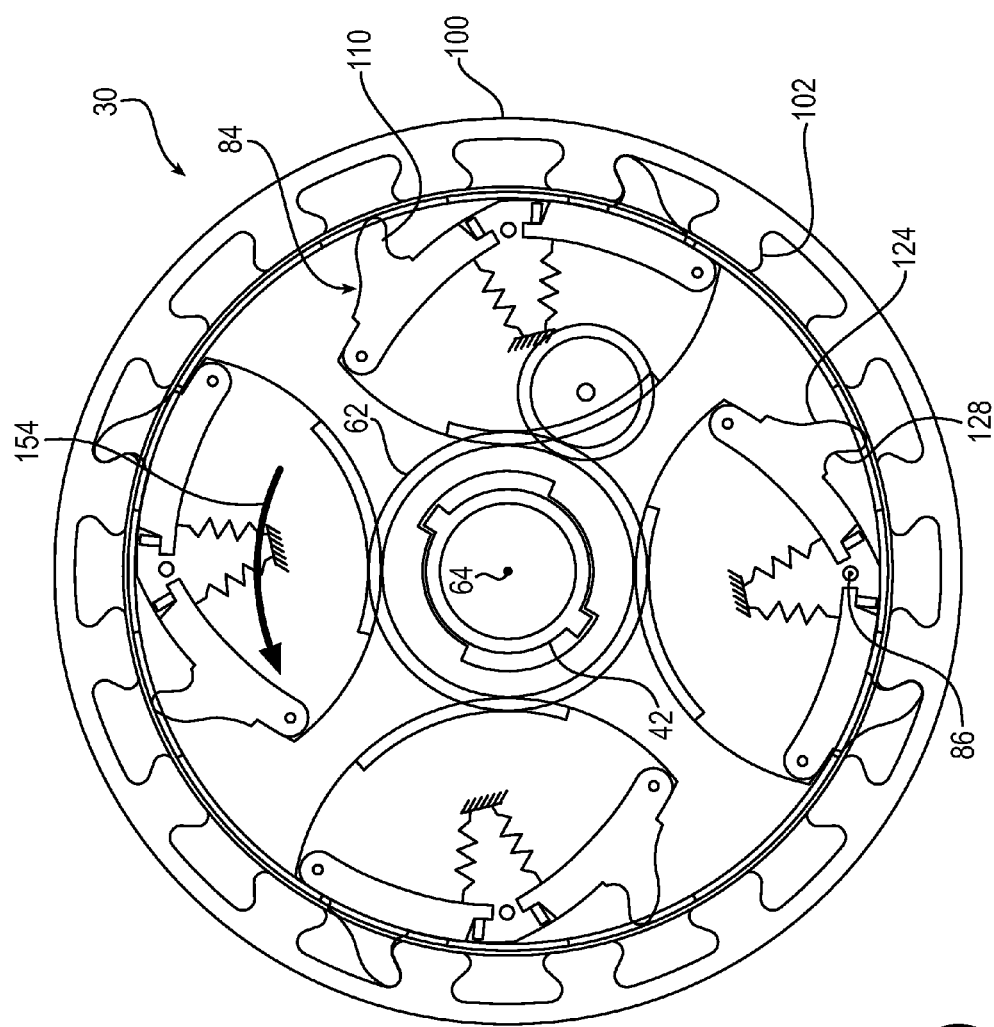
FIG. 10 is yet another partial elevated cross-section top view of the exemplary actuator of FIG. 3.

Turning now to FIGS. 5-10, the self-locking actuator 30 is shown in cross section in various alignments depicting the screw 42 operating in each of the first and second rotational directions under an opposing external load (FIGS. 5 and 6), the screw 42 operating in each of the first and second rotational directions under an aiding external load (FIGS. 7 and 8), and the drive gear 62 in a stationary position and the screw 42 being acted upon by oppositely acting external loads (FIGS. 9 and 10).

Figure 5:
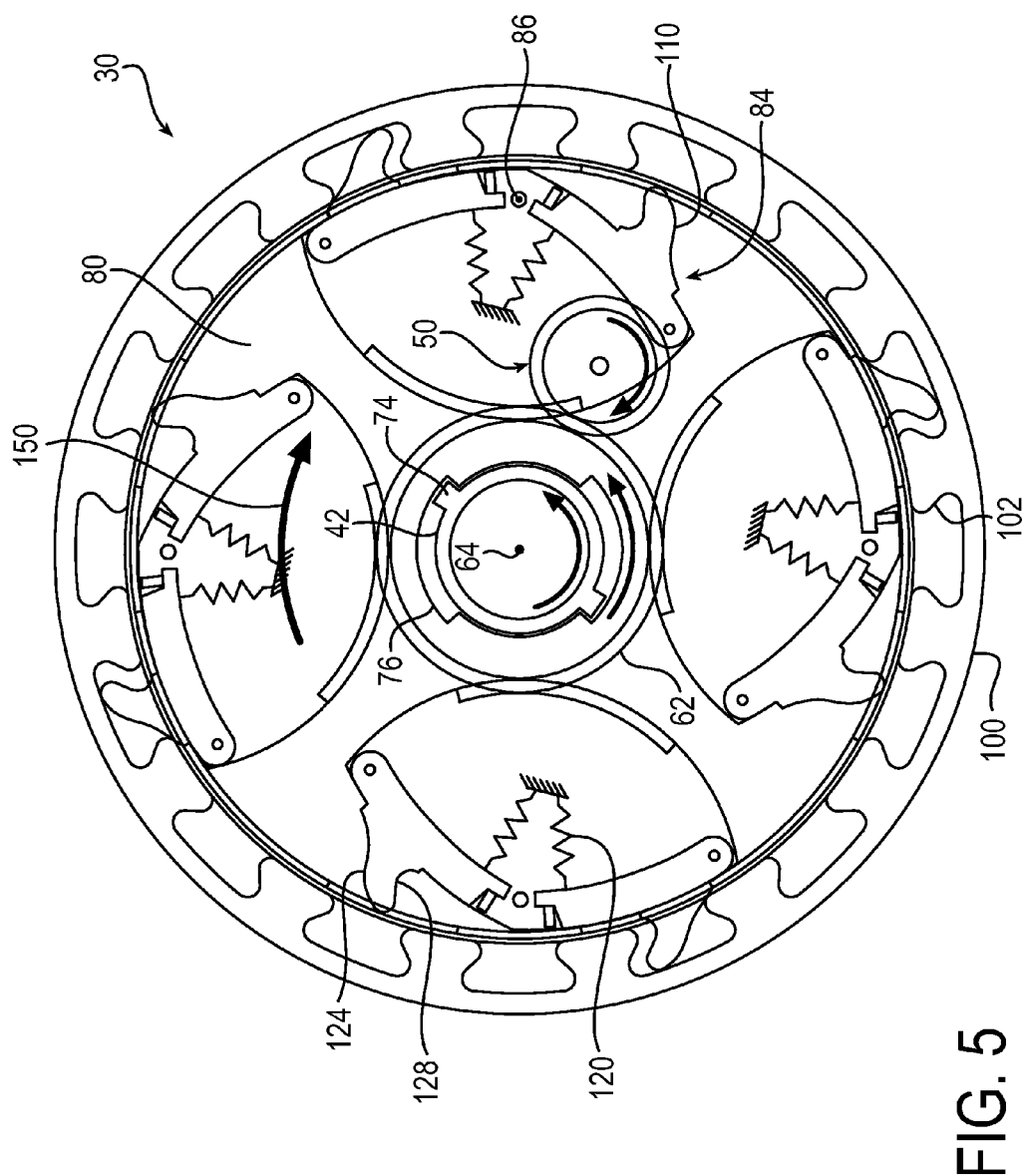
FIG. 5 is another partial elevated cross-section top view of the exemplary actuator of FIG. 3.
Figure 6:
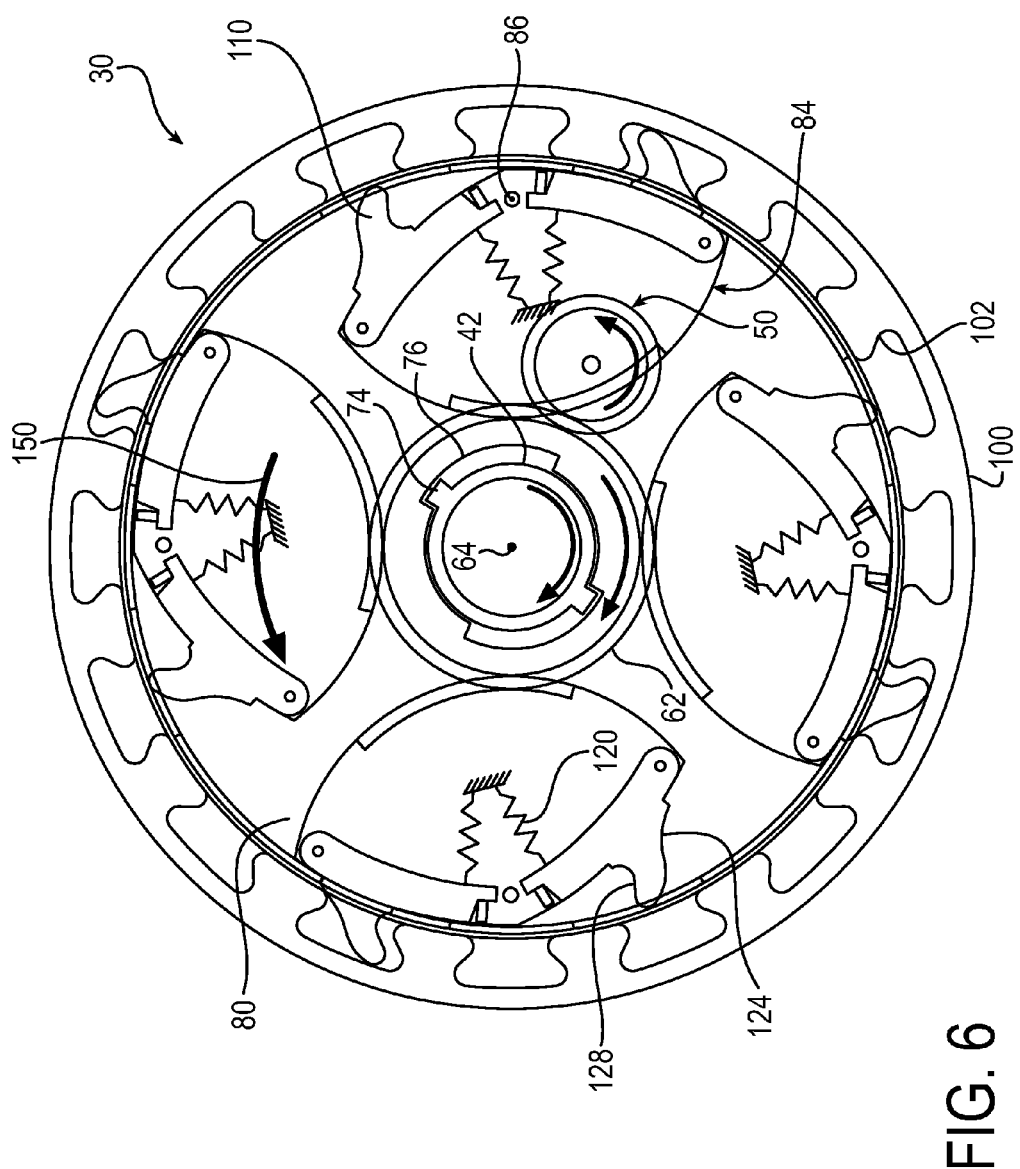
FIG. 6 is yet another partial elevated cross-section top view of the exemplary actuator of FIG. 3.

Referring first to FIGS. 5 and 6, the actuator 30 is depicted with the screw 42 operating in each of the first and second rotational directions about the rotational axis 64 under an opposing external load acting on the screw 42. To achieve the depicted rotationally engaged positioning of the drive gear 62 and the screw 42, the motor 50 was first activated to cause the drive gear 62 to rotate in the depicted counter-clockwise direction (FIG. 5) or clockwise direction (FIG. 6). The lost motion configuration of the keys 74 and grooves 76 enabled rotation of the drive gear 62 to first pivot the swivel assembly 84 prior to further rotation of the drive gear 62 causing the keys 74 and grooves 76 to engage, thus driving rotation of the screw 42 with the drive gear 62 in the depicted direction. Thus prior to rotation of the screw 42, the swivel assembly 84 was pivoted via engagement with the drive gear 62 to move one of the pawls 110 towards the cage 100, which pawl 110 is hereby referred to as the engaged pawl 110. The other pawl 110 of the pair of pawls 110 was moved to a position disengaged from the cage 100 and is hereby referred to as the disengaged pawl 110.

While the screw 42 is rotating in the relative direction, the ramp surface 124 of the engaged pawl 110 successively cams against the cage 100 and is pushed away from one cage slot 102, and is then biased towards a next cage slot 102 by the respective biasing member 120 as the screw 42 rotationally advances. When the screw 42 is acted upon by an opposing load 150 acting in a direction opposite the current rotational direction of the screw 42, the motor 50 will overcome the opposing load. Thus, the screw 42 will not be caused to reverse rotational direction such that the catch surface 128 of the engaged pawl 110 positively locks with the respective cage slot 102.

Though, as previously mentioned, in other applications where the motor 50 is not capable over overcoming the opposing load, and the opposing load has a force greater than the rotational force of the motor 50 acting on the screw 42, the screw 42 may be caused to reverse rotational direction. However, this reverse in direction may be prevented from substantially continuing via engagement of the catch surface 128 of the engaged pawl 110 with a cage slot 102. Thus, in this situation, once the opposing load 150 lessens or is no longer present, rotation of the screw 42 in the activated direction may continue.

Referring next to FIGS. 7 and 8, the actuator 30 is depicted with the screw 42 operating in each of the first and second rotational directions about the rotational axis 64 under an aiding external load acting on the screw 42. Similar to the depiction of FIGS. 5 and 6, while the screw 42 is rotating in the relative direction, the ramp surface 124 of the engaged pawl 110 successively cams against the cage 100 and is pushed away from one cage slot 102, and is then biased towards a next cage slot 102 by the respective biasing member 120 as the screw 42 rotationally advances. However, when the screw 42 is acted upon by an aiding load 152 acting in the same direction as the current rotational direction of the screw 42, the screw 42 may be caused to rotate more quickly than the drive gear 62 depending on the magnitude of the load and the current motor velocity.

In this case, the screw 42 is caused to disengage from the drive gear 62. The swivel assembly 84 is caused to pivot in a direction reversing which pawl 110 of the pair of pawls 110 is the engaged pawl 110. Thus the previously disengaged pawl 110 is engaged and positively locked with a cage slot 102 to prevent further rotation of the screw 42 in the same direction. Simultaneously, the drive gear 62 continues to advance, again reversing the engagement of the pair of pawls 110 and reengaging with the screw 42. Until the aiding load 152 lessens or is no longer present, the swivel assembly 84 is successively pivoted back and forth in the opposite first and second pivot directions in this manner to successively prevent the screw 42 from substantially advancing under the aiding load 152 while allowing the drive gear 62 to continue advancing to "catch up" and re-couple with the screw 42.

Referring last to FIGS. 9 and 10, the actuator 30 is depicted with the drive gear 62 in a stationary position and the screw 42 being acted upon by oppositely acting external loads. Similar to FIGS. 5 and 6, an external load 154 moving the screw 42 in one rotational direction will merely engage the catch surface 128 of the engaged pawl 110 with a cage slot. On the other hand, similar to FIGS. 7 and 8, an external load 154 moving the screw 42 in a direction opposite the one rotational direction will cause the swivel assembly 84 to pivot engaging the previously disengaged pawl 110 with an adjacent cage slot 102 to present an opposed catch surface 124 to positively lock with the adjacent cage slot 102.

Thus as demonstrated via FIGS. 5-10, pivoting of each swivel assembly 84 about a respective pivot axis 86 prevents rotation of the screw 42 in each of opposing first and second rotational directions. Via pivoting of the swivel plates 90 in response to external loads on the screw 42, one pawl 110 of each pair of pawls 110 is aligned to prevent rotation of the screw 42 in a first rotational direction, while the other pawl 110 is aligned to prevent rotation of the screw 42 in the second rotational direction. Separate swivel assemblies 84 are not required for preventing rotation of the screw 42 in the first direction versus in the second direction, though multiple swivel assemblies 84 are depicted in case of failure of one or more of the swivel assemblies 84.

Further, in the event of a failure of the motor shaft 52 or failure of the drive gear 62 to maintain engagement with the motor 50, the bearings 68 (FIG. 3) may be skewed roller bearings that will generate a low level of friction between the drive gear 62 and the housing 40 to retain locking operation of the actuator 30 relative to an external load. In the event of a complete failure of the pawl support 80, irreversibility of the actuator 30 may still be achieved via activation of the motor 50.

In summary, a self-locking actuator 30 for moving a flight control surface of an aircraft and for self-locking in response to an external load applied to the actuator 30 includes a motor 50, a screw 42, and a drive gear 62 that is rotatably driven by the motor 50 to rotationally couple with the screw 42. A pawl support 80 is coupled to and rotatable with the screw 42, and a swivel assembly 84 is coupled to the pawl support 80 for rotational movement with the screw 42 and pivoting movement relative to the screw 42. The swivel assembly 84 engages a cage 100 that is fixed relative to the rotating screw 42, drive gear 62, and swivel assembly 84. Pivoting of the swivel assembly 84 about a pivot axis 86 engages the swivel assembly 84 with the cage 100 to positively lock with the cage 100 and to prevent rotation of the screw 42 in each of first and second opposite rotational directions of the screw 42 about a rotational axis 64 of the screw 42.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A self-locking actuator comprising:
an actuator housing;
a motor;
a screw supported in the housing for rotational movement;
a drive gear rotatably driven by the motor to rotationally couple the drive gear with the screw;
a cage fixed relative to the housing and having a plurality of circumferentially spaced apart cage slots;
a pawl support rotatable with the screw; and
a swivel assembly coupled to the pawl support for pivoting movement about a pivot axis parallel to a rotational axis of the drive gear, and having an arcuate arrangement of teeth in meshed engagement with the drive gear,
wherein the drive gear is disposed in a lost motion configuration with the screw such that the drive gear is driven to pivot the swivel assembly between engagement and disengagement with one of the plurality of cage slots prior to the drive gear being driven to engage the screw for rotational movement of the screw with the drive gear.

2. The self-locking actuator of claim 1, wherein the swivel assembly pivots about the pivot axis to engage the swivel assembly with the cage to positively lock with the cage and to prevent rotation of the screw in each of first and second opposite rotational directions of the screw about the rotational axis.

3. The self-locking actuator of claim 1, wherein the swivel assembly includes a pawl that is moved into and out of engagement with the one of the plurality of cage slots via pivoting of the swivel assembly.

4. The self-locking actuator of claim 3, wherein the pawl is farther radially outwardly disposed than the arcuate arrangement of teeth relative to the rotational axis.

5. The self-locking actuator of claim 1, wherein relative to a stationary drive gear, rotation of the screw in each of a clockwise and counterclockwise direction about the rotational axis drives the swivel assembly to pivot about the pivot axis to positively lock with the cage to prevent the rotation of the screw in its respective rotational direction.

6. The self-locking actuator of claim 1, wherein the pivot axis is fixed relative to and rotates with the screw about the rotational axis such that the swivel assembly rotates with the screw.

7. The self-locking actuator of claim 1, wherein the cage is translationally fixed relative to the screw.

8. The self-locking actuator of claim 1, wherein the cage is circumferentially disposed about the screw, and wherein the cage slots open radially inwardly towards the rotational axis.

9. The self-locking actuator of claim 1, wherein the drive gear is disposed about the screw.

10. A self-locking actuator comprising:
   an actuator housing;
   a screw supported in the housing for rotational movement;
   a cage fixed relative to the housing;
   a swivel plate for pivoting movement about a plate pivot axis parallel to a rotational axis of the screw, wherein the plate pivot axis is fixed relative to the screw and rotates with the screw about the rotational axis; and
   a pawl coupled to the swivel plate for engagement with the cage, wherein the pawl is pivotally coupled to the swivel plate for pivoting movement about a pawl pivot axis parallel to the plate pivot axis, and wherein pivoting movement of the swivel plate moves the pawl between a first position engaged with the cage and a second position disengaged from the cage.

11. The self-locking actuator of claim 10, further including a pair of pawls coupled to the swivel plate for engagement with the cage, each pawl coupled for pivoting movement about a respective pawl pivot axis parallel to the plate pivot axis.

12. The self-locking actuator of claim 10, wherein the cage has a plurality of circumferentially spaced apart cage slots, and wherein the pawl pivots about the pawl pivot axis to engage and disengage the plurality of cage slots when the screw rotates in a first rotational direction about the rotational axis and the pawl positively locks with one of the plurality of cage slots when the screw rotates in a second rotational direction opposite the first rotational direction.

13. The self-locking actuator of claim 10, wherein the pawl is biased towards the cage by a biasing element.

14. The self-locking actuator of claim 10, wherein the pawl includes a ramp surface that cams outwardly and a catch surface that positively locks with the cage.

15. The self-locking actuator of claim 14, wherein the cage has a plurality of circumferentially spaced apart cage slots, and wherein engagement of the ramp surface with a cage slot of the cage pivots the pawl about the pawl pivot axis while engagement of the catch surface with the cage slot or another cage slot of the cage positively locks the pawl with to the respective cage slot.

16. A self-locking actuator comprising:
   an actuator housing;
   a motor;
   a screw supported in the housing and rotatable relative to the housing, the screw drivable by the motor;
   a cage fixed relative to the housing; and
   a swivel assembly coupled to the screw for rotation with the screw and pivotable about a pivot axis parallel to a rotational axis of the screw,
   the swivel assembly pivotable about the pivot axis to prevent rotation of the screw in each of opposing first and second rotational directions of the screw about a rotational axis via engagement of the swivel assembly with the cage.

17. The self-locking actuator of claim 16, wherein the motor is coupleable with swivel assembly to drive the swivel assembly, and wherein the swivel assembly is pivotable about the pivot axis in each of a first pivot direction or a second pivot direction opposite the first pivot direction via each of the motor or an external load external to the self-locking actuator rotating the screw.

18. The self-locking actuator of claim 16, wherein the motor is coupleable with the screw to drive the screw, and wherein the swivel assembly is pivotable about the pivot axis to engage the cage prior to the motor coupling with the screw to drive rotation of the screw.

19. The self-locking actuator of claim 16, wherein the swivel assembly and the cage are configured to positively lock with one another in response to a load external to the self-locking actuator urging the screw in either of the first or second rotational directions.

20. The self-locking actuator of claim 16, wherein the swivel assembly is configured to pivot about the pivot axis to engage the cage while the screw is rotating via the motor and while the screw is not rotating via the motor.

* * * * *